United States Patent [19]
Balliello

[11] Patent Number: 5,964,938
[45] Date of Patent: Oct. 12, 1999

[54] PIGMENT GRANULATION

[75] Inventor: Paolo Balliello, Rheinfelden, Switzerland

[73] Assignee: Ciba Specialty Chemicals Corporation, Tarrytown, N.Y.

[21] Appl. No.: 09/159,999

[22] Filed: Sep. 24, 1998

[51] Int. Cl.$^6$ .......................... C09B 67/02; C09B 67/10
[52] U.S. Cl. .......................... 106/493; 106/494; 106/498
[58] Field of Search .................................. 106/493, 494, 106/498

[56] References Cited

U.S. PATENT DOCUMENTS

| | | | |
|---|---|---|---|
| 4,134,725 | 1/1979 | Buchel et al. | 264/117 |
| 4,264,552 | 4/1981 | McMahon et al. | 264/117 |
| 5,082,498 | 1/1992 | Kurtz et al. | 106/499 |
| 5,173,116 | 12/1992 | Roth | 106/401 |

FOREIGN PATENT DOCUMENTS

| | | |
|---|---|---|
| 174543 | 3/1986 | European Pat. Off. . |
| 0424896 | 5/1991 | European Pat. Off. . |
| 510392 | 10/1992 | European Pat. Off. . |
| 2179137 | 11/1973 | France . |
| 2352582 | 12/1977 | France . |
| 2405983 | 5/1979 | France . |
| 98/17729 | 4/1998 | WIPO . |

OTHER PUBLICATIONS

Derwent Abstr. 91–126428 for EP 424896 (May 1991).
Derwent Abstr. 79–33626B for FR 2405983 (May 1979).
Derwent Abstr. 77–86951Y for FR 2352582 (Dec. 1977).
Derwent Abstr. 73–65881U for FR 2179137 (Nov. 1973).
Chemical Abstract No. 127:360020, abstract of Japanese Patent Specification No. 09–272812, Oct. 1997.
WPIDS Abstract No. 73–65881U, abstract of German Patent Specification No. 2,317,175, Nov. 1973.
WPIDS Abstract No. 77–86951Y, abstract of German Patent Specification No. 2,723,221, Dec. 1977.
WPIDS Abstract No. 78–33761A, abstract of German Patent Specification No. 2,748,243, May 1978.
WPIDS Abstact No. 79–33626B, abstract of German Patent Specification No. 2,844,710, Apr. 1979.
WPIDS Abstract No. 91–001012, abstract of European Patent Specification NO. 403,917, Dec. 1990.
WPIDS Abstract No. 92–358655, abstract of European Patent Specification No. 510392, Oct. 1992.

*Primary Examiner*—Anthony Green
*Attorney, Agent, or Firm*—David R. Crichton

[57] ABSTRACT

The invention relates to a process for granulating a free-flowing pulverulent organic pigment, which comprises treating the pigment at a temperature from 15 to 120° C. with from 7 to 200% by weight, based on the dry weight of the pigment, of at least one gaseous inert substance which contains oxygen in its molecule, is liquid at 20° C./1 bar and has a boiling point of not more than 150° C.

15 Claims, No Drawings

PIGMENT GRANULATION

The invention relates to a novel process for granulating organic colour pigments which are highly agglomerating in the wet state, using aqueous or alcoholic vapours.

Organic pigments consist of very fine particles, of low solubility in customary solvents, whose dimensions can lie within the range from submicroscopic to about 100 μm. For practical use, organic pigments having approximate particle sizes of from 0.01 to 0.1 μm for transparent forms and from 0.1 to 10 μm for opacifying forms have proved most suitable.

Such pigments, however, all have the great disadvantage of producing dust. In the course of their use, therefore, costly measures (for example of a workplace safety, ecological or quality assurance nature) are necessary, and valuable material is lost.

The physical properties of the pigment particles, on the other hand, are very important to their use. For instance, very small particles in particular possess a strong propensity to agglomeration, which has an adverse effect in particular on the dispersibility of the pigments [cf. Farbe und Lack 82/1, 7–14 (1976)] and on their tinting strength.

A very large number of methods have therefore already been investigated for converting the pigments into a low-dust form. However, it has been found that improvements in the dusting behaviour can be obtained in the case of the known methods only, among other disadvantages, at the expense of other physical properties of the pigment particles and, especially, at the expense of dispersibility. In practice, low-dust pigment preparations with good dispersibility can be prepared only by adding additional substances. The presence of these additional substances, however, is highly undesirable per se and is tolerated only as a lesser evil. On the basis of the resulting problems of compatibility with the substrates to be pigmented, moreover, it is necessary to prepare different pigment preparations for each pigment, so that the logistics is hampered and the costs of manufacture are increased. Consequently, the known methods, described accordingly, are unable to satisfy wholly the long-held desire for dust-free organic pigments having the same good physical properties.

DE-A 27 48 243 describes the granulation of talc to achieve a high bulk density. The talc is moistened with water or steam to a water content of from 5 to 30%. As a result of the additives, however, the resulting talc cannot be used to pigment high molecular mass materials.

FR 2 179 137 describes the granulation of water-soluble dyes in the presence of additives which do not permit them to be used for pigmenting high molecular mass materials. In Example 2, methanol is added in the course of the kneading operation.

Another known compacting method is that of pelletizing. DE-A 27 23 221 discloses a room-temperature pelletizing operation, whereby the equilibrium value of the sorption of water vapour by the powder material is exceeded. Droplets of liquid are formed which trigger the agglomeration. The result with organic pigments, however, is not serviceable granules but instead a powder which still produces dust. If the amount of liquid is increased, moreover, then despite precautionary measures the result is highly agglomerated products having performance properties worse than those of the powder. Despite the use of a vibrator, it is not possible entirely to avoid crusting.

FR 2 405 983 discloses a process for producing low-dust granules wherein the pigment is sprayed, in a fluidized bed, with a binder solution or binder emulsion. Anthraquinones and isoindolinones are among the pigments mentioned. In Example 12 a pigment preparation is made which consists of 90.4% C.I. Pigment Yellow 109, 3.7% ethylene oxide-propylene oxide copolymer, 0.5% hydroxypropylcellulose and 5.4% oleyl alcohol. This amount of binder is much too high, however, for numerous pigment applications.

EP 403 917 discloses the manufacture of pigment preparations comprising 3 to 30% by weight of a surfactant, the pigments being employed as aqueous dispersions. Temperatures from 50 to 90° C. are indicated in the examples. The pigments disclosed include neither aminoanthraquinone nor isoindolinone nor diketopyrrolo[3,4-c]pyrrole pigments (nomenclature according to W. Herbst and K. Hunger, "Industrial Organic Pigments", ©VCH 1993). Although the amount of surfactant can be reduced to 3% by weight, it is still too high for numerous applications. Furthermore, the product is obtained in a powdery rather than a dust-free form.

In addition, EP 424 896 discloses fine, low-dust pigment granules which have a still lower content of waxlike binder and other extraneous substances. Of particular importance is the use of an apparatus in which the material charged thereto is exposed predominantly to strong turbulence and moderate impact forces with minor shear stresses. This process, however, is suitable predominantly for inorganic pigments, and only one single example of an organic pigment is disclosed: in Example 13, the monoazopigment used is Pigment Red 176, the wax used is 0.72% by weight of a fatty acids mixture with a melting point of 57–61° C., and 50–51% by weight of water is used (based in each case on the fine granules). The wax is sprayed onto the pigment via a nozzle.

Finally, EP 510 392 discloses granules which are purportedly easy to disperse and are low-dusting and which, as a consequence of the permanent cavities obtained in the course of drying, exhibit a sharp increase in volume relative to the initial pigment. In the course of their preparation, fine bubbles of an inert gas are dispersed without pressure into an aqueous pigment suspension. Following mechanical separation of the liquid, shaping takes place by known methods; for extrusion to strands, a residual moisture content of from 50 to 80% by weight is indicated. However, this method is highly complex, and the homogeneity of the products is unsatisfactory.

Moreover, when these known agglomeration methods are applied in particular to organic colour pigments which have a strong tendency to agglomerate in the wet state owing to their physical properties, the results obtained are not wholly satisfactory in terms of dispersibility and dusting behaviour.

The aim of the invention was to provide highly dust-free, readily dispersible, concentrated and universally applicable organic pigment granules in which, in contrast to the known granules, and apart from the external aspect, the physical parameters of the pigment particles are changed as little as possible from those of the pulverulent initial pigment. By physical parameters are meant not only the abovementioned properties but also all other technically measurable or applications-relevant properties. The intention is that these pigment granules should as far as possible be able to be prepared by means of simple and universally applicable methods, in simple, inexpensive and easy-to-clean apparatus, and without the absolute need to add organic solvents.

The aim of the invention has, very surprisingly, been achieved in a very simple manner by means of the present invention.

The invention relates to a process for granulating a free-flowing pulverulent organic pigment, which comprises treating the pigment at a temperature from 15 to 120° C. with from 7 to 200% by weight, based on the dry weight of the pigment, of at least one gaseous inert substance which includes oxygen in its molecule, is liquid at 20° C./1 bar and has a boiling point of not more than 150° C.

Treatment is preferably carried out with from 40 to 150% by weight, with particular preference from 60 to 100% by weight, based on the dry weight of the pigment, of gaseous inert substance. The optimum amount depends on the chemical identity and on the specific surface of the pigment, and on the desired strength of the granules, and can readily be determined for each pigment by conventional methods; simply, for example, by visual monitoring of the granulation process. The temperature is preferably from 30 to 100° C., with particular preference from 60 to 80° C., though amply satisfactory results may also be obtained at about room temperature (from 15 to 30° C.).

With particular preference, the maximum amount of the inert substance should not exceed the saturation limit of the pigment's absorption capacity at the treatment temperature, so that a liquid phase cannot form. The phase or form of the inert substance absorbed in gaseous form by the pigment, on the other hand, is not limited. In calculating the saturation limit, it is the local concentration of the gaseous inert substance in the direct vicinity of the pigment that is to be taken into account.

An inert substance is a substance which is, essentially, chemically unchanged by the process. In the course of this process, however, it is indeed possible for binding forces to occur between the inert substance and the pigment: for example, tension, capillary or van der Waal's forces or hydrogen bonds. Judicious inert substances are those in which the pigment to be granulated is of low solubility ($\leq 100$ mg/l) at from 20 to 150° C. Examples of inert substances containing oxygen in their molecule are alcohols, ketones, carboxylic acids and their esters, and also water. Preference is given to a $C_1$–$C_8$ alcohol, a $C_3$–$C_8$ ketone, water or a mixture thereof. Particular preference is given to those inert substances which have at least one hydroxyl group.

The $C_1$–$C_8$ alcohol can, if desired, be methanol, ethanol, n-propanol, isopropanol or a butanol, for example, which can be used in pure form or, in particular, as aqueous mixtures. Preference is given to $C_1$–$C_4$ alcohols, especially methanol, ethanol, isopropanol or n-butanol.

The $C_3$–$C_8$ ketone can, if desired, be acetone, ethyl methyl ketone, methyl propyl ketone or cyclohexanone, for example, and can be used in pure form or, in particular, as aqueous mixtures. Preference is given to $C_3$–$C_6$ ketones, especially acetone or ethyl methyl ketone, and particular preference to ethyl methyl ketone.

With very particular preference, however, use is made of from 90 to 100% by weight of water, based on the overall amount of inert substance, it being possible, in particular, to use exclusively water.

If a mixture of water, a $C_1$–$C_8$ alcohol and/or a $C_3$–$C_8$ ketone is used, it is preferably an azeotropic mixture. Advantageously, this enables the mixture to be used again readily.

The oxygen-containing inert substances are judiciously supplied in gaseous form to the pigments; for example, in the form of their vapours, which may be pure or diluted, if desired, with a carrier gas.

The term free-lowing pulverulent pigment is intended to be understood as a pigment which can be shaken through a metal sieve of mesh size 1×1 mm essentially without direct application of force (gentle shaking is not direct application of force). Free-flowing pulverulent pigments include, for example, dry, commercially customary pigments which may possibly have been ground and which with particular advantage make it possible to produce highly homogeneous granules.

The process of the invention is preferably suitable for organic pigments which agglomerate strongly in the presence of liquid water on drying so that the coloristic results obtained under customary dispersing conditions are, undesirably, different from those obtained with pigment powders that have remained dry. The person skilled in the art knows, or can readily determine experimentally, those pigments which agglomerate strongly in the presence of liquid water on drying and can therefore, in order to avoid this agglomeration, be granulated to particular advantage by the process of the invention.

Particularly preferred pigments are aminoanthraquinone, isoindolinone or diketopyrrolo-[3,4-c]pyrrole pigments having the component structures (I), (II) and (III) respectively:

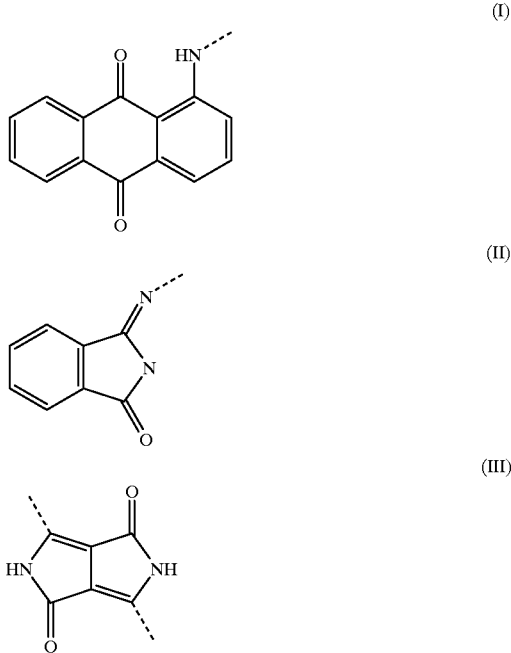

Especially preferred pigments are aminoanthraquinone or diketopyrrolo[3,4-c]pyrrole pigments, particularly aminoanthraquinone pigments.

The preferred aminoanthraquinone pigment is C.I. Pigment Red 177 of the formula (IV)

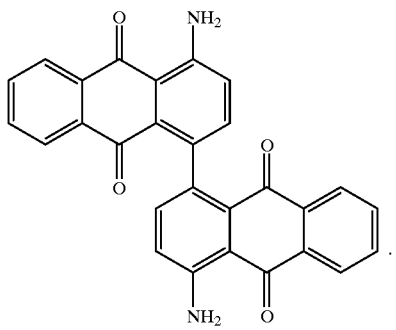

Preferred isoindolinone pigments are of the formula (Va) or (Vb)

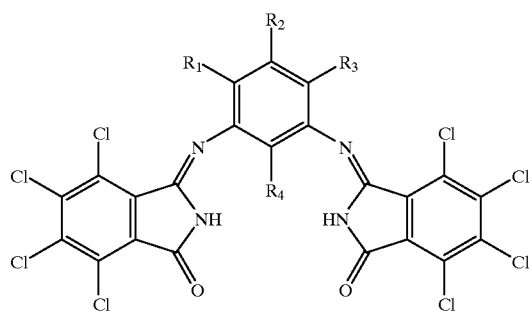

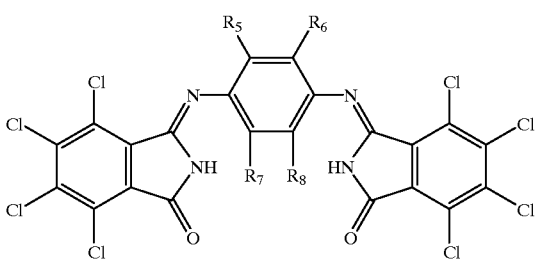

in which $R_1$, $R_2$, $R_3$, $R_4$, $R_5$, $R_6$, $R_7$ and $R_8$ independently of one another are hydrogen, $C_1$–$C_{18}$alkyl, $C_1$–$C_4$alkoxy, halogen or trifluoromethyl.

A particularly preferred isoindolinone pigment is C.I. Pigment Yellow 110.

Preferred pyrrolo[3,4-c]pyrrole pigments are of the formula (VI)

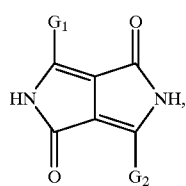

in which $G_1$ and $G_2$ independently of one another are a group of the formula

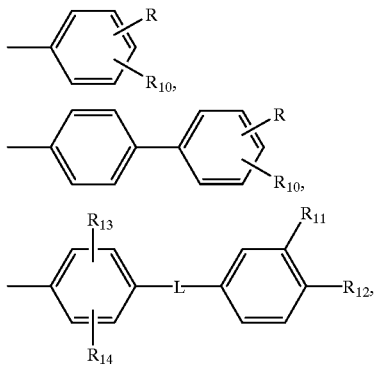

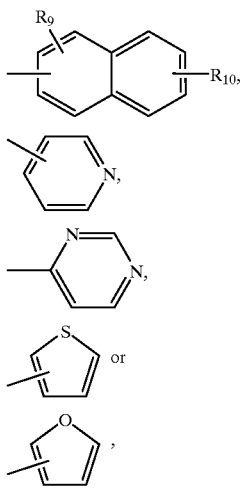

in which $R_9$ and $R_{10}$ independently of one another are hydrogen, halogen, $C_1$–$C_{18}$alkyl, $C_1$–$C_{18}$alkoxy, $C_1$–$C_{18}$alkylthio, $C_1$–$C_{18}$alkylamino, $C_2$–$C_{18}$dialkylamino, —CN, —NO$_2$, phenyl, trifluoromethyl, $C_5$–$C_6$cycloalkyl, imidazolyl, pyrazolyl, triazolyl, piperazinyl, pyrrolyl, oxazolyl, benzoxazolyl, benzothiazolyl, benzimidazolyl, morpholinyl, piperidyl, pyrrolidinyl, —C═N— ($C_1$–$C_{18}$alkyl) or

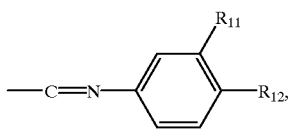

$R_{11}$ and $R_{12}$ independently of one another are hydrogen, halogen, $C_1$–$C_6$alkyl, $C_1$–$C_6$alkoxy or —CN, $R_{13}$ and $R_{14}$ independently of one another are hydrogen, halogen or $C_1$–$C_6$alkyl, L is —CH$_2$—, —CH(CH$_3$)—, —C(CH$_3$)$_2$—, —CH═N—, —N═N—, —O—, —S—, —SO—, —SO$_2$— or —NR$_{15}$—, and $R_{15}$ is hydrogen or $C_1$–$C_6$alkyl.

A particularly preferred pyrrolo[3,4-c]pyrrole pigment is C.I. Pigment Red 254.

Any halogen substituents are, for example, iodine, fluorine, especially bromine and preferably chlorine.

Examples of $C_1$–$C_4$alkyl are methyl, ethyl, n-propyl, isopropyl, n-butyl, sec-butyl and tert-butyl, for $C_1$–$C_6$alkyl additionally n-amyl and hexyl, and for $C_1$–$C_{18}$alkyl additionally heptyl, octyl, 2-ethylhexyl, nonyl, decyl, dodecyl, tetradecyl, hexadecyl and octadecyl.

Examples of $C_5$–$C_6$cycloalkyl are cyclopentyl and especially cyclohexyl.

Examples of $C_1$–$C_4$alkoxy are methoxy, ethoxy, n-propoxy, isopropoxy and butyloxy, and for $C_1$–$C_{18}$alkoxy additionally hexyloxy, decyloxy, dodecyloxy, hexadecyloxy and octadecyloxy.

Examples of $C_1$–$C_{18}$alkylthio are methylthio, ethylthio, propylthio, butylthio, octylthio, decylthio, hexadecylthio and octadecylthio.

Examples of $C_1$–$C_{18}$alkylamino are methylamino, ethylamino, propylamino, hexylamino, decylamino, hexadecylamino and octadecylamino.

Examples of $C_2$–$C_{18}$dialkylamino are dimethylamino, diethylamino, methylpropylamino, ethylhexylamino, methyidecylamino, dioctylamino and ethylhexadecylamino, the carbon atoms of both alkyl radicals being counted together.

The organic pigment used in accordance with the invention preferably has a particle size of from 0.01 to 10 μm. By this is meant that at least 90% by weight of the particles have this particle size. Preferably, the organic pigment has an average particle size of from 0.2 to 2 μm. With particular preference the organic pigment has a narrow particle size distribution; in other words, at least 80% by weight of the particles have a particle size that lies within a range whose extent is not more than one power of ten—for example, between 0.5 and 5 μm or between 0.2 and 2 μm. A narrow particle size distribution can be achieved by methods known to the person skilled in the art; for example, by treatment in a polar inert liquid at elevated temperature. Suitable liquids, temperatures and durations of this treatment, which may be very different depending on the pigment, are very well known to the person skilled in the art. They have also been disclosed in the technical literature for all classes of pigment and for numerous individual pigments as well.

The pigment may be completely dry or may include a certain residual moisture content which, however, must preferably be so low that it does not impair the free-flow properties. Residual moisture can, for example, be water or else a customary diluent having a boiling point of from about 50 to 220° C. Preferably, the amount of residual moisture is not more than 5%, with particular preference not more than 1%, based on the overall weight of the moist pigment. The pigment can be pure or else may include additives selected from customary additives such as, for example, all emulsifiers, texture improvers and binders known to the person skilled in the art.

The binder can comprise, for example, a saturated or unsaturated long-chain pure acid, a mixture thereof—for example, a mixture of homologues—or salts or esters thereof. Long-chain acids are those in which there is at least one linear chain consisting of 8 carbon atoms. Preferred binders are based on abietic acid. The amount of binder is preferably not more than 2% by weight, in order to allow the obtention of universal granules having very good compatibility in as many applications as possible (in coatings, for example). Very particular preference is given to granules which contain less than 0.5% by weight of binder or which are even entirely free from binder. Although in the latter case it is unclear how the pigment particles are held together in the granules, it has been found, highly surprisingly, that even binder-free granules prepared in accordance with the invention combine a remarkable dispersibility with good mechanical stability.

The emulsifier can be, for example, a copolymer of ethylene oxide and propylene oxide, a fatty alcohol ethoxylate or an alkylphenol ethoxylate; for example, an emulsifier of the Emulan® series (BASF). The amount of emulsifier is preferably not more than 1% by weight.

Additives are independent of one another and are all optional. If desired, they can be added before or during granulation. Depending on the desired granule properties it is possible to use additives having any desired functions in any desired combination. The preferred overall amount of additives is preferably not more than 2% by weight and, with particular preference, not more than 0.5%. With particular preference, the granulation mass consists essentially of the organic pigment, the oxygen-containing inert substance and, if desired, the residual moisture of the pigment and/or the additives. With very particular preference, the granulation mass consists essentially of the organic pigment and the oxygen-containing inert substance.

The process of the invention is judiciously carried out such that the pigment particles are agitated gently but without exposure to forces of compression or shearing. Preferably, thorough mixing with the gaseous inert substance is ensured; a high turbulence, however, is not necessary. This process can take place in any desired apparatus provided that it can be operated in such a way that very few if any compression or shearing forces arise. The apparatus is preferably heatable. It is possible, for example, to use a vessel which rotates non-vertically around its own axis, such as a rotating drum, or a fluidized-bed apparatus, such as a spray dryer, for example. A particular advantage of the spray dryer is that granulation can be carried out directly after drying.

The pigment is introduced into the apparatus, after which the gaseous inert substance is passed in until its desired amount has been absorbed by the pigment. Where the granules have still not attained the desired particle size, agitation of the pigment particles is continued for a while. Preferably, the gaseous inert substance is introduced as close as possible to the pigment and in the form of a mixture with a carrier gas, such as air or nitrogen. With particular preference, the inlet is situated as far as possible from the outlet of the carrier gas—at an opposite place in the apparatus, for example. The process can be operated batchwise or else continuously if desired.

An advantage associated with the process of the invention is that very simple introductory devices (simple nozzles, for example) can be used. The amount of carrier gas can be regulated independently of the amount of gaseous inert substance; the amount of carrier gas can, if desired, be kept low or it may even be omitted entirely. In addition, the amount of gaseous inert substance can be varied within wide limits without modifying the construction of the apparatus; during operation, for example.

The granulated product can be dried in a conventional manner directly after granulation. This can take place in the same apparatus or following the transfer of the product to a conventional dryer. If desired, the granulated product can also be subjected to additional shaping in, for example, a further granulation stage, and dried only after that stage. In the latter case, the further granulation is preferably carried out at low pressure, using, with particular preference, the granulation technique described in WO 98/17729.

The pigment granules prepared in accordance with the invention are low-dusting and have excellent dispersibility. The physical parameters of the pigment particles within the pigment granules are virtually unchanged relative to those of the pigment particles in the initial pulverulent pigment. In general, therefore, the organic pigment in the pigment granules likewise has a particle size of from 0.01 to 10 μm.

The invention therefore also relates to pigment granules obtainable by granulating a free-flowing pulverulent organic pigment at a temperature from 15 to 120° C. by means of from 7 to 200% by weight, based on the dry weight of the pigment, of at least one gaseous inert substance which contains oxygen in its molecule, is liquid at 20° C./1 bar and has a boiling point of not more than 150° C.

On account of the properties highlighted above, the pigment granules of the invention are especially suitable in a coloristically effective amount for pigmenting high molecular mass organic material, especially plastics and coatings.

The invention therefore also relates to the use of pigment granules prepared in accordance with the invention for pigmenting high molecular mass organic material.

The high molecular mass organic material for whose pigmentation the pigment granules of the invention can be used can be natural or synthetic in origin. High molecular mass organic materials usually have molecular weights from about $10^3$ to $10^7$ g/mol or more. They may be, for example, natural resins, drying oils, rubber or casein or modified natural substances thereof, such as chlorinated rubber, oil-modified alkyd resins, viscose, cellulose ethers or esters, such as ethylcellulose, cellulose acetate, cellulose propionate, cellulose acetobutyrate or nitrocellulose, but especially are fully synthetic organic polymers (thermosets and thermoplastics) as are obtained by addition polymerization, condensation polymerization or polyaddition. From the class of the addition polymerization resins mention may be made primarily of polyolefins, such as polyethylene, polypropylene or polyisobutylene, and substituted polyolefins, such as polymers of vinyl chloride, vinyl alcohol, vinyl acetate, butyl vinyl ether, styrene, acrylonitrile, acrylic or methacrylic acid, acrylates or methacrylates, or butadiene, and also copolymers of these monomers, such as ABS or EVA, in particular.

From the series of the polyaddition resins and condensation polymerization resins mention may be made of the condensates of formaldehyde with phenols, known as phenolic resins, and of the condensates of formaldehyde with urea, thiourea and melamine, known as amino resins, of the polyesters which are used as paint resins, and indeed of both saturated resins, such as alkyd resins, and unsaturated resins, such as maleate resins, and also of the linear polyesters and polyamides, polyurethanes or silicones.

The high molecular mass compounds referred to can be present individually or in mixtures, as plastic masses or melts. They can also be in the form of their monomers or in the polymerized state in dissolved form as film formers or binders for coating materials or printing inks, such as linseed oil varnish, nitrocellulose, alkyd resins, melamine resins and urea-formaldehyde resins or acrylic resins, for example.

The pigment granules of the invention can be added in any desired, coloristically effective amount to the high molecular mass organic material that is to be pigmented. A pigmented composition judiciously contains 0.1–30% by weight, preferably 1–20% by weight, based on the high molecular mass organic material that is to be pigmented, of pigment granules according to the invention.

For the pigmentation of organic materials the pigment granules of the invention can be used individually. It is likewise possible, however, in order to obtain different shades or colour effects, to add other colouring constituents, such as white, coloured, black or special-effect pigments, in any desired amounts, to the high molecular mass organic materials, in addition to the pigment granules of the invention.

The pigmenting of the high molecular mass organic substances with the pigment granules of the invention takes place, for example, by mixing such pigment granules into these substrates using roll mills, mixers or milling apparatus. The pigmented material is subsequently brought into the desired end form by techniques known per se, such as calendering, compression moulding, extrusion, spreading, casting or injection moulding. All additives customary in the plastics industry, examples being plasticizers, fillers and stabilizers, can be incorporated into the polymers in customary amounts before or after the incorporation of the pigment. In order to produce non-rigid mouldings or to reduce their brittleness it is particularly desirable to incorporate plasticizers, examples being esters of phosphoric, phthalic or sebacic acid, into the high molecular mass compounds before they are shaped.

For pigmenting coating materials and printing inks, the high molecular mass organic materials and the pigment granules of the invention, alone or together with customary additives such as fillers, other pigments, siccatives and plasticizers, for example, are finely dispersed or dissolved in an organic solvent or solvent mixture suitable for all of them. One possible procedure here is to dissolve or disperse the individual components alone, or else two or more of them together, and only then to combine all of the components.

The colourings obtained in, for example, plastics, coating materials or printing inks, preferably in coating materials or printing inks and, with particular preference, in coating materials, are notable for excellent properties which match those of the pulverulent pigments.

Where the high molecular mass material to be pigmented is a coating material, it is in particular a speciality coating material and, with very particular preference, an automotive coating material.

The examples which follow illustrate the invention without restricting its content:

EXAMPLE 1

142.5 g of dry pulverulent 4,4'-diamino-1,1'-dianthraquinonyl (C.I. Pigment Red 177 [65300]) are introduced into a 3 l glass flask on a ®Rotavapor (Büchi AG, Flawil, CH) which sits in a bath. The speed of rotation is set at 11 rpm and the bath temperature at 80° C. Elsewhere, air is laden with water vapour by passing it into water which is heated at just below the boiling point, and the resulting droplet-free gas mixture is passed through a heat exchanger which is thermostated at 105° C. The stream of air is regulated to 34 l/h and then introduced into the pigment over 3 h through a tube which extends deep into the glass flask. The overall amount of water vapour absorbed by the pigment is 91.0 g. The moist granules are tipped onto a dish and dried at 90° C./160 mbar. Typical grains exhibit a circular form with dimensions of approximately 1×1×2 mm. The granules produce virtually no dust and in coloristic terms, when incorporated conventionally into flexible PVC by means of a roll mill, give virtually identical results to the pulverulent starting material.

EXAMPLE 2

102.5 g of dry pulverulent C.I. Pigment Red 177 are introduced into a 3 l glass flask on a ®Rotavapor (Büchi AG, Flawil, CH) which sits in a bath. The speed of rotation is set at 14 rpm and the bath temperature at 70° C. Elsewhere, air is laden with water vapour by passing it into water which is heated to about 60° C., and the resulting droplet-free gas mixture is passed through a heat exchanger which is thermostated at 105° C. The stream of air is regulated to 120 l/h and then introduced into the pigment over 4.6 h through a tube which extends deep into the glass flask. The overall amount of water vapour absorbed by the pigment is 75.1 g. The moist granules are tipped onto a dish and dried at 90° C./160 mbar. Typical grains exhibit a circular form with dimensions of approximately 1×1×2 mm. The granules produce virtually no dust and in coloristic terms, when incorporated conventionally into flexible PVC by means of a roll mill, give virtually identical results to the pulverulent starting material.

EXAMPLE 3

The procedure of Example 1 is used to treat 128.3 g of dry 3,6-di(4'-chlorophenyl)-2,5-dihydropyrrolo[3,4-c]pyrrole-1, 4-dione (C.I. Pigment Red 254 [56110]) with 9.1 g of water vapour. The granules produce virtually no dust and give excellent applicational results in thermoplastics.

EXAMPLE 4

The procedure of Example 3 is used to treat 124.5 g of dry C.I. Pigment Red 254 [56110] with 13.7 g of ethyl acetate vapour. The granules produce virtually no dust and give excellent applicational results in thermoplastics.

EXAMPLE 5

The procedure of Example 3 is used to treat 125.0 g of dry C.I. Pigment Red 254 [56110] with 24.8 g of tert-amyl alcohol vapour. The granules produce virtually no dust and give excellent applicational results in thermoplastics.

EXAMPLE 6

The procedure of Example 2 is used to treat 104.4 g of dry C.I. Pigment Red 254 [56110] with 122.8 g of ethyl methyl ketone vapour. The granules produce virtually no dust and give excellent applicational results in thermoplastics.

EXAMPLE 7

The procedure of Example 2 is used to treat 110.9 g of dry C.I. Pigment Red 177 with 89.2 g of an azeotropic vapour mixture of water and 1-butanol (44.5:55.5% by weight). The granules produce virtually no dust and give excellent applicational results in thermoplastics.

EXAMPLE 8

The procedure of Example 7 is repeated but using a ternary azeotrope of butyl vinyl ether, water and 1-butanol (63:8:29% by weight). The granules produce virtually no dust and give excellent applicational results in thermoplastics.

EXAMPLES 9–16

The procedure of Examples 1–8 is repeated but replacing the glass flask by a cylindrical pelletizer with an inclination of 50 to the horizontal which has a diameter of 200 mm, a length of 600 mm and an impact baffle diameter of 100 mm. At 10 rpm the throughput is about 1 kg/h based on the dry pigment. The results are comparable with those of Examples 1–8.

COMPARATIVE EXAMPLE 1

In accordance with Examples 1 and 9 of DE-A 27 48 243, 300 g of dry C.I. Pigment Red 177 are sprayed uniformly through a dual-substance nozzle with 30.6 g of water for 1.7 minutes in a cylindrical pelletizer having a diameter of 200 mm. The stream of nitrogen is regulated such that the particle size is from about 10 to 100 $\mu$m. Under these conditions there is heavy production of dust, which escapes from the apparatus. The moist product (288 g) is dried at 100° C. to give 262 g (87.5%) of dry end product which exhibits no granulation whatsoever.

The dust numbers ($S_F$ and total amount in %) measured on a ™SP3-PN01 (Lorenz Messgerätebau) sedimentation measuring apparatus are even higher than in the initial C.I. Pigment Red 177 material.

COMPARATIVE EXAMPLE 2

In accordance with Examples 1 and 9 of DE-A 27 23 221, 1500 g of dry C.I. Pigment Red 177 are sprayed uniformly through a dual-substance nozzle with a mixture of 300 g of water and 75 g of ™PROZESSOEL ES 107 (emulsifying, sulfonated mineral oil, Esso AG) for 20 minutes in a cylindrical pelletizer having a diameter of 200 mm. The stream of nitrogen is regulated such that the particle size is from about 10 to 100 $\mu$m. Under these conditions there is heavy production of dust, which escapes from the apparatus. The moist product (1659 g) is dried at 100° C. to give 1379 g (91.4%) of dry end product which exhibits no granulation whatsoever.

The dust numbers (SF and total amount in %) measured on a ™SP3-PN01 (Lorenz Messgerätebau) sedimentation measuring apparatus are even higher than in the initial C.I. Pigment Red 177 material.

I claim:

1. A process for granulating a free-flowing pulverulent organic pigment, which comprises treating the pigment at a temperature from 15 to 120° C. with from 7 to 200% by weight, based on the dry weight of the pigment, of at least one gaseous inert substance which contains oxygen as a molecular component, is liquid at 20° C./1 bar and has a boiling point of not more than 150° C.

2. A process according to claim 1, wherein treatment is carried out with from 40 to 150% by weight, based on the dry weight of the pigment, of gaseous inert substance.

3. A process according to claim 2, wherein treatment is carried out with from 60 to 100% by weight, based on the dry weight of the pigment, of gaseous inert substance.

4. A process according to claim 1, wherein the temperature is from 30 to 100° C.

5. A process according to claim 4, wherein the temperature is from 60 to 80° C.

6. A process according to claim 1, wherein the temperature is from 15 to 30° C.

7. A process according to claim 1, wherein the gaseous inert substance is a $C_1$–$C_8$alcohol, a $C_3$–$C_8$ketone, water or a mixture thereof.

8. A process according to claim 7, wherein the gaseous inert substance is water.

9. A process according to claim 1, wherein the pulverulent pigment is an aminoanthraquinone, isoindolinone or diketopyrrolo[3,4-c]pyrrole pigment.

10. A process according to claim 9, wherein the pulverulent pigment is an aminoanthraquinone or diketopyrrolo[3,4-c]pyrrole pigment.

11. A process according to claim 10, wherein the pulverulent pigment is an aminoanthraquinone pigment.

12. A process according to claim 1, wherein the free-flowing pulverulent organic pigment has a residual moisture content of not more than 5%, based on the combined weight of the organic pigment and residual moisture.

13. A process according to claim 12, wherein the free-flowing pulverulent organic pigment has a residual moisture content of not more than 1%, based on the overall weight of the moist pigment.

14. A process according to claim 1, wherein an overall amount of additives, comprising binders, texture improvers and emulsifiers, is not more than 2% by weight.

15. A process according to claim 14, wherein the overall amount of additives, comprising binders, texture improvers and emulsifiers, is not more than 0.5% by weight.

* * * * *

UNITED STATES PATENT AND TRADEMARK OFFICE
CERTIFICATE OF CORRECTION

PATENT NO. : 5,964,938
DATED : OCTOBER 12, 1999
INVENTOR(S) : PAOLO BALLIELLO ET AL.

It is certified that error appears in the above-identified patent and that said Letters Patent is hereby corrected as shown below:

on the title page, Section [30] should read:

-- [30] Foreign Application Priority Data

Oct. 1, 1997    Europe    97810724.1 --.

Signed and Sealed this

Eleventh Day of April, 2000

Attest:

Q. TODD DICKINSON

*Attesting Officer*    *Director of Patents and Trademarks*